United States Patent

Donecker et al.

[11] Patent Number: 5,882,462
[45] Date of Patent: Mar. 16, 1999

[54] METHOD FOR FABRICATING A CORRUGATED COMPOSITE CHANNEL

[75] Inventors: Peter Gregory Donecker, Durham; Lawrence Nicholas Varholak, Jr., Southbury; Mark John Schmitz, Cheshire, all of Conn.; Harold Marion Goodridge, Seattle, Wash.; Jeffrey A. Lauder, Cedar City, Utah; Kirk Douglas Skaggs, Federal Way, Wash.

[73] Assignees: Dow-United Technologies Composite Products, Wallingford, Conn.; Boeing Defense and Space Group, Seattle, Wash.

[21] Appl. No.: 673,689

[22] Filed: Jun. 25, 1996

Related U.S. Application Data

[60] Provisional application No. 60/010,608 Feb. 2, 1996.

[51] Int. Cl.⁶ .................................. B31F 1/22; B27N 3/10
[52] U.S. Cl. ......................... 156/205; 156/212; 156/213; 264/137; 264/257; 264/286; 264/328.1; 264/258
[58] Field of Search .................................. 428/156, 182; 156/209, 205, 208, 212, 23, 245, 310; 264/137, 257, 258, 286, 297.2, 328.1

[56] References Cited

U.S. PATENT DOCUMENTS

| | | | |
|---|---|---|---|
| 479,999 | 8/1892 | Thompson | 928/182 |
| 4,329,194 | 5/1982 | Green et al. | 156/179 |
| 4,758,294 | 7/1988 | Storch | 156/93 |
| 4,894,102 | 1/1990 | Halls et al. | 156/94 |
| 4,992,228 | 2/1991 | Heck et al. | 264/135 |
| 5,080,748 | 1/1992 | Takahashi | 156/212 |
| 5,123,985 | 6/1992 | Evan et al. | 156/213 |
| 5,129,813 | 7/1992 | Shepherd | 475/405 |
| 5,137,071 | 8/1992 | Ashton et al. | 156/382 |
| 5,201,981 | 4/1993 | Whiteside | 156/211 |
| 5,217,766 | 6/1993 | Flonc et al. | 428/34.5 |
| 5,252,164 | 10/1993 | Mills | 156/212 |

FOREIGN PATENT DOCUMENTS

| | | |
|---|---|---|
| 0 350 633 | 1/1990 | European Pat. Off. . |
| 0 368 734 | 5/1990 | European Pat. Off. . |
| 42 34 002 | 4/1994 | Germany . |
| 91/10547 | 7/1991 | WIPO . |

OTHER PUBLICATIONS

Musch et al., "Tooling with reinforced elastomeric materials," Composites Manufacturing, vol. 3, No. 2, pp. 101–111 (1992).
Abstract of JP 09 011371.
Abstract of JP 08 156087.

*Primary Examiner*—Donald Loney
*Attorney, Agent, or Firm*—Nemia C. Damocles

[57] ABSTRACT

A method for making a corrugated fiber reinforced preform for a corrugated channel is disclosed which involves the sequential application of fiber plies to a shaping tool, each of the plies individually formed to the contours of the shaping tool, using a corrugating tools, restraining means used to maintain the plies in conformance with the tool. The plies are then subjected to debulking and heated to stabilize the fiber plies in their shaped condition, with additional plies applied thereover using the same steps of application, forming, restraining and stabilizing to produce a thick debulked fiber preform which avoids wrinkling of the fibers at the radius between the web and side portions of the corrugated channel.

6 Claims, 4 Drawing Sheets

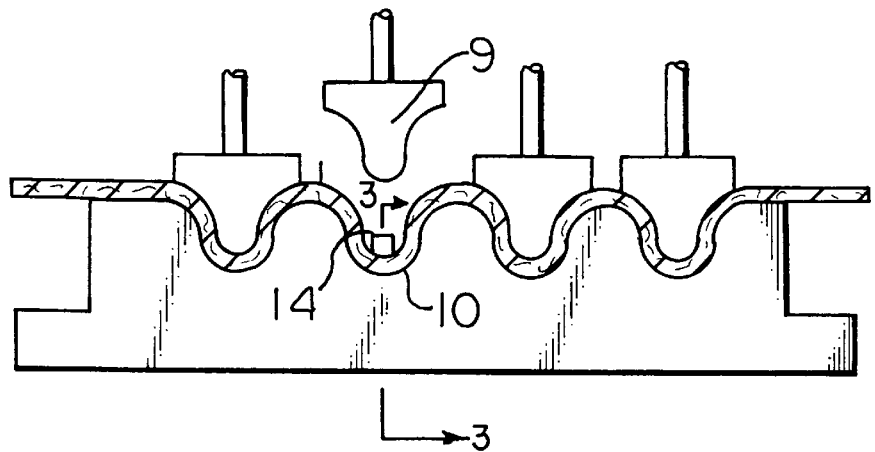
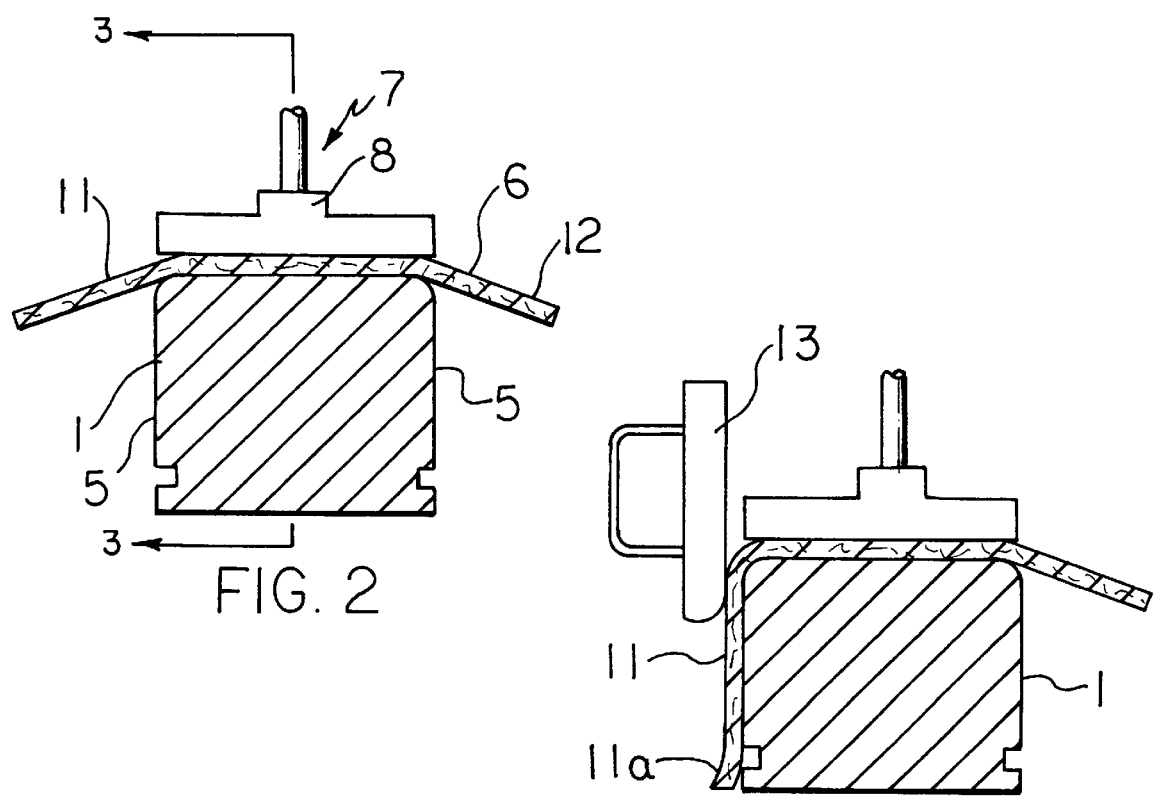

METHOD FOR FABRICATING A CORRUGATED COMPOSITE CHANNEL

STATEMENT OF GOVERNMENT INTEREST

This invention was made with government support under contract F33657-91-C-0006 awarded by the Department of the Air Force. The government has certain rights in this invention.

CROSS REFERENCE TO RELATED APPLICATION

This application claims priority in U.S Provisional Application No. 60/010,608, filed Feb. 2, 1996.

TECHNICAL FIELD

This invention relates to a method of preparing a fiber preform and more particularly, to a method for preparing a corrugated fiber preform for producing a corrugated composite channel.

BACKGROUND

Current methods of forming fiber reinforced corrugated channel preforms have been generally unsuccessful. A typical channel, such as an I-beam, has a web section and upper and lower flange sections. In a corrugated composite channel, the web section is not planar, but has undulations with peaks and valleys, which provides strength characteristics with particular application in aircraft because of their unique structural properties. The term "corrugated channel" refers to such a structure.

To produce a fiber reinforced composite channel, it is typical to use multiple layers or plies of fiber, with each flat ply of sufficient width and length to form the web and flanges from the same fibers. A "preform" is a group of fiber plies having the shape of the finished part, with the plies being suitably debulked and stabilized for placement in a closed mold for resin injection in accordance with a resin transfer molding process.

However, significant difficulties arise in forming a corrugated channel as when one attempts to form the undulations and flange sections from multiple fiber plies, significant wrinkling or waviness occurs particularly at the radius between the web and flange portions. Such defects are unacceptable because they provide weaknesses in the finished part.

SUMMARY OF THE INVENTION

It is an object of the present invention to provide a method for producing a corrugated fiber reinforced composite channel without these defects.

It is another object to provide a method which is simple, susceptible to automation, and which is adaptable to producing corrugated structures of significant thickness.

These and other objects of the present invention are achieved by a method which comprises providing one or more fiber plies containing a stabilizer and having a thickness no greater than 0.07 inch, placing the plies over a shaping tool, having peaks and valleys to form corrugations, forcing the fiber plies to conform to the corrugations, using a plurality of corrugating tools, each corrugating tool having a shape to match a single valley, for holding the plies against the shaping tool, wiping portions of the fiber plies over sides of the shaping tool to form channel flange portions, applying restraining means sequentially in each of the valleys. as each individual corrugating tool is lifted, to hold the fiber plies on the shaping tool, subjecting the plies to a compressive force and heating the plies to debulk and stabilize the fiber plies such that they maintain the corrugated shape, cooling the assembly and then removing the compressive force and restraining means, and then applying one or more fiber plies in accordance with the previous steps and continuing until the desired preform thickness is reached.

Using the inventive method, preforms of virtually any thickness can be assembled into the proper shape, without wrinkling of the individual plies, thus assuring higher yields in part production, while avoiding weaknesses in the finished structure.

BRIEF DESCRIPTION OF THE DRAWINGS

FIG. 1d is a side view showing the application of restraining straps to the shaped ply.

FIG. 2 is a transverse cross-sectional view of the fiber ply located on the preforming tool with a corrugation foot located in one of the undulations of the tool, taken along line 2—2 of FIG. 1c.

FIG. 3 is a transverse cross-sectional view showing the formation of the flange portions of the channel during wiping of the fiber ply against the sides of the shaping tool.

DETAILED DESCRIPTION OF THE INVENTION

Figure 1A:
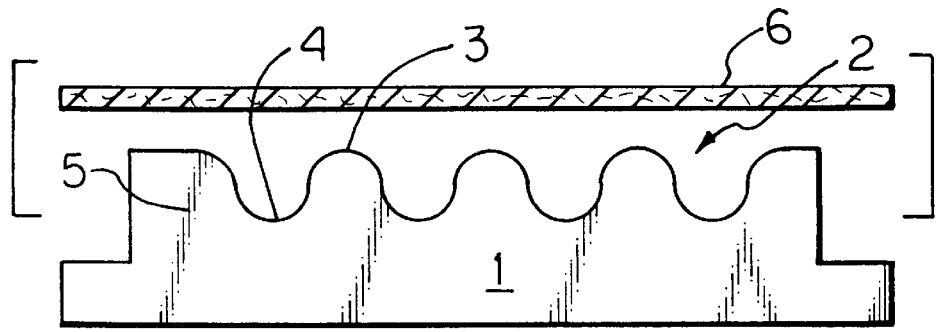
FIG. 1a is a side view of the tool for forming a corrugated composite channel, and a ply of fiber material.

Referring to FIG. 1a, a preforming tool 1 includes a shaped surface 2 which has the features of the article to be produced. In this case, the tool has a plurality of undulations, with peaks 3 and valleys 4, for forming a corrugated surface which will be a web section of a structural channel. In addition, the side surfaces 5 of the tool are of sufficient length to produce and form a pair of flanges disposed on opposite sides of the corrugated web of the channel.

To produce a fiber reinforced composite channel may require the provision up to 30 or more fiber plies to be assembled, shaped, and debulked, meaning compacted to form a dense fiber preform. It is also preferred to stabilize the preform so that it maintains its compacted shape and this is usually accomplished by using fiber plies containing a stabilizer, which will be discussed further below. Such a preform is later placed into a mold where the fiber plies are infiltrated with resin which is then cured to produce the finished part.

Referring again to FIG. 1a, a single ply 6 of fiber material is shown adjacent to the surface 2. For ease in illustration, the process will be described in relation to a single ply, but the process is applicable to using a group of plies, so long as the thickness is no greater than about 0.07 inch, with graphite fibers. The following description is thus not limited to treating a single ply alone.

Such ply material is typically provided in a flat sheet, similar to cloth, which is taken from a roll and cut to the length and width required. Such a fiber ply is typically of sufficient pliability to be adapted to most shaped surfaces. However, there is a natural tendency to return to the flat shape which may cause shifting of the fiber ply after it is applied to the tool. Thus, means are required to secure the plies during assembly.

Figure 1B:
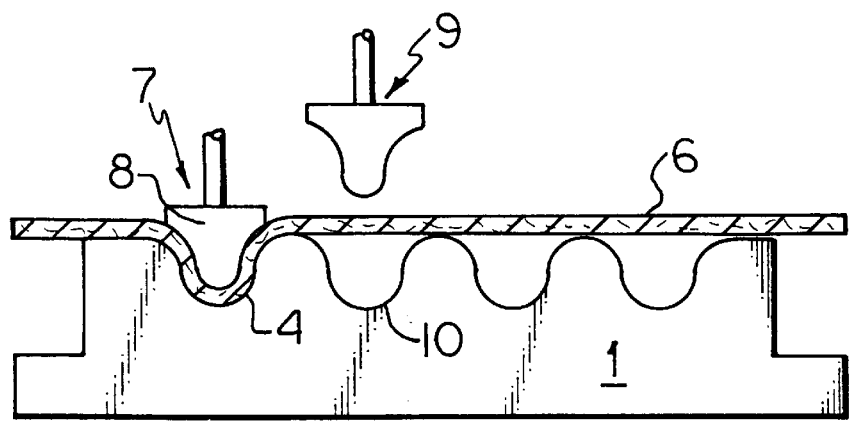
FIG. 1b is a side view showing the forming of the ply to the first valley.
Figure 1C:
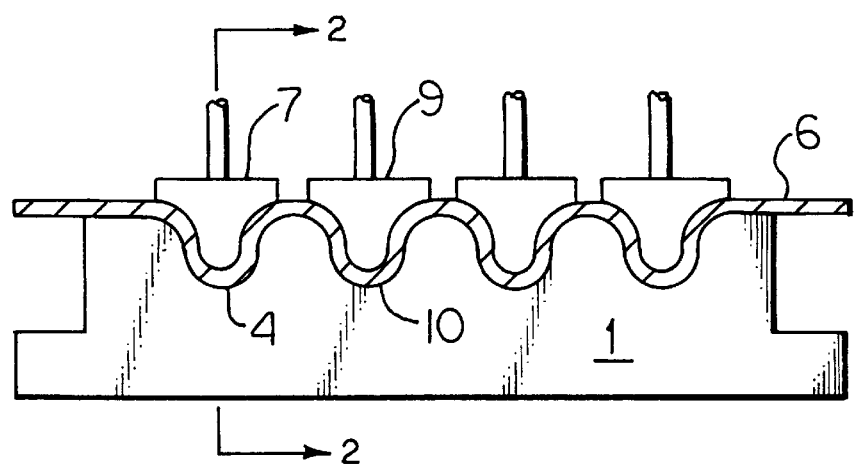
FIG. 1c is a side view showing all of the corrugating tools in place.

Referring to FIG. 1b, a corrugating tool 7 is shown which is used to press the fiber ply 6 so as to conform to the valley 4 of the shaping tool. Generally, enough tools should be available to fill all the valleys. Each tool has an end 8 which corresponds in shape to the shape of the valley. After the first tool is applied, a second tool 9 is inserted into the next valley 10, with the process continuing until all the valleys are filled, as shown in FIG. 1C. Alternatively, all the corrugating tools can be used at the same time, if done slowly to allow the ply to shift to conform to the surface.

The sequence of application of the corrugating tools is left to the user's discretion. However, in some instances, it is preferred to begin at the middle and then apply the tools out to the ends, while in others it may be preferred to work from a first end to a second end of the shaping tool. Further, it should be recognized that the shaping tool itself may be the actual mold such that the plies are assembled on the mold surface, avoiding the need to remove the shaped preform from the mold. Rather, after assembly, the mold is closed and resin injected to produce the part, avoiding an intermediate handling step.

Once all of the valleys have been formed and the corrugating tools are in place, the next step is to form the side flanges. Referring to FIG. 2, side portions 11 and 12 of the fiber ply 6 are in essense draped over the tool 1. To form the flanges, these portions must be pressed against the sides 5 of the preforming tool, so as to substantially attain the shape of the flange portions.

Referring to FIG. 3, a tool 13 is used to press or wipe the side portion 11 against the tool 1. The wiping step should be repeated several times so as to assure that the fiber ply maintains substantially the side flange shape. Excess fiber la at the periphery of the side portion may be removed at this time.

Figure 4:
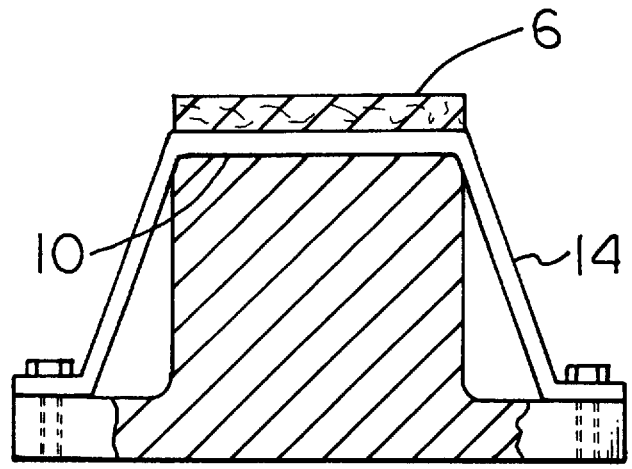
FIG. 4 is a transverse cross-sectional view of the preform tool and fiber ply taken along line 3—3 of FIG. 1d.

After forming the side flanges, the preform must be stabilized. However, this is preferrably done with the corrugating tools removed. Referring to FIG. 4, a resilient strap 14 is located within the valley 10 to hold the fiber ply 6 in position, after the corrugating tool 9 is removed. Once strapped to prevent movement, the tool is relocated in the valley, as shown in FIG. 1d. The sequence is repeated, i.e., the next tool is lifted, an elastic strap or other restraining means are placed into the valley to hold the fiber ply in position and the tool returned. Referring to FIG. 4, an elastic strap 14 is tensioned and anchored on opposite sides of the tool so as to hold the fiber ply in the shaped condition. After all the shapes are in position, the corrugating tools are removed.

Figure 5:
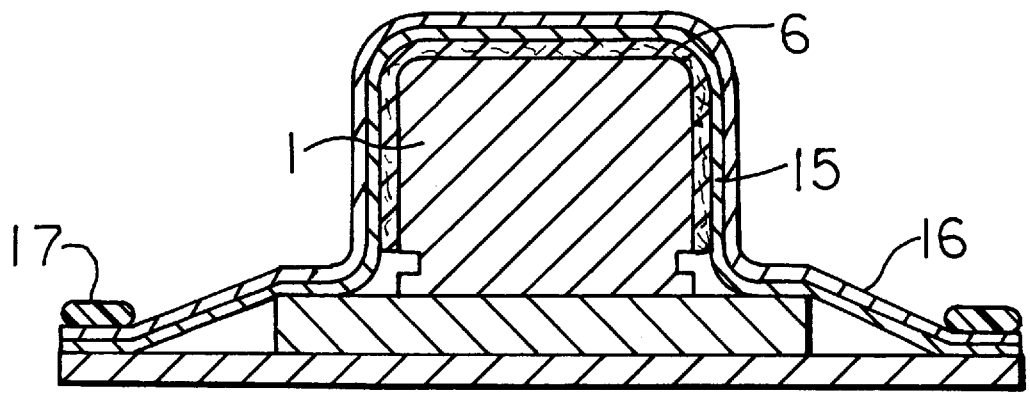
FIG. 5 is a transverse cross-sectional view, showing the application of a vacuum bag over the fiber ply.

Referring to FIG. 5, after the corrugating tools have been removed, a release film 15 is applied over the fiber ply. This is done over the elastic straps to assure that fiber shifting does not occur. An air impermeable barrier layer 16, such as a vacuum bag is then placed over the release film, with the ends sealed with a clamp 17. It should be understood that vacuum bag systems are available that have integral seals and that function without clamps, and such systems, among others known in the industry may be used in the present invention.

After the layer 16 has been applied, the fiber ply 6 is subjected to a compressive force, preferably using vacuum, i.e., air is removed from the beneath the ply and atmospheric pressure thus compresses the fiber ply. The fiber ply is then heated to a melting temperature of a polymeric material referred to as a "stabilizer" which is used to hold the fabric layer in the shape of the tool.

Various stabilizers are available for producing this effect, for example, the materials described in U.S. Pat. Nos. 5,271,766, 5,080,851, 5,071,711 or 4,992,228 can be used to stabilize these fibers. In addition, a stabilizer may be used which contains either: (1) a single resin that is capable of at least partially curing with itself; or (2) a mixture containing resin and hardener that is capable of at least partial curing. Such as described in U.S. Pat. Nos. 5,427,725 or 5,427,726.

Examples of suitable resins which can cure with themselves include epoxy resins, polyamide and particularly bismaleimide resins, polycyanate ester resins, vinyl ester resins (with suitable initiators and promoters) and benzocyclobutene resins. The most preferred example is 1,1'-MDA bismaleimide resin. Examples of suitable polyamide and bismalemide resins are described in Stenzenberger, "Recent Advances in Thermosetting Polyimides", 20 *British Polymer Journal* 383–393 (1988). Examples of suitable commercially available resins that can cure with themselves include 5250-4-RTM BMI resin, manufactured by Cytec Chemical Co.

There is no criticality in the choice of stabilizer, other than that it have sufficient adhesiveness to hold the fiber ply in its shape and be compatible with the later injected resin.

Any fiber material, such as glass, graphite, silicon carbide or aramid may be used, as well as any fiber type or size, for producing the fiber ply. The fibers themselves may be of any particular orientation desired in the finished part and may comprise weaved, or braided fibers, among others.

Figure 6:
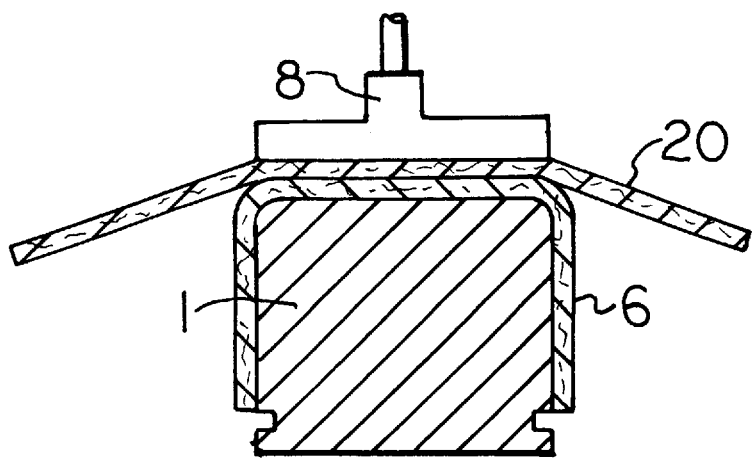
FIG. 6 is a transverse cross-sectional view, similar to FIG. 2, showing the application of a second fiber ply for the sequential assembly of additional plies to increase the preform thickness.
Figure 7:
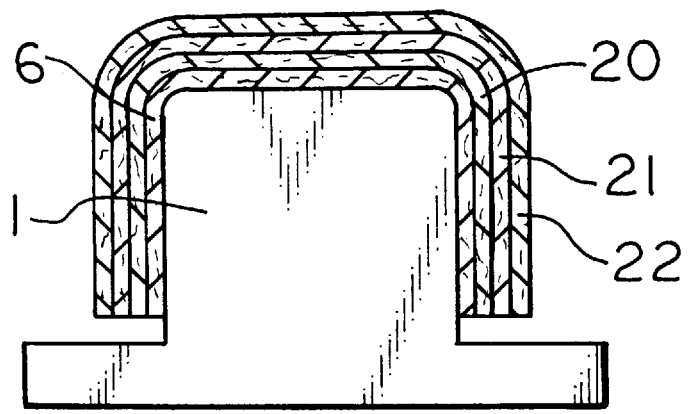
FIG. 7 is a transverse cross-sectional view, showing a multi-ply assembly.
Figure 8:
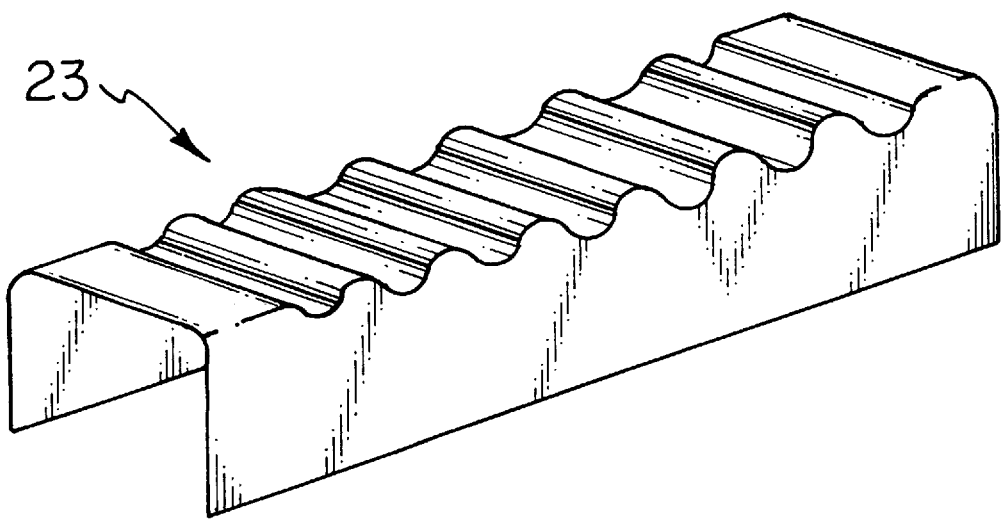
FIG. 8 is a schematic perspective view of a corrugated channel preform produced in accordance with the method of the invention.

After the first fiber ply has been formed, the impermeable layer, restraining means and release film are removed. Then, a second fiber ply is placed over the first ply using the same sequence of steps described in relation to the first ply. FIG. 6 shows a second ply 20 placed over the first shaped and stabilized ply 6, using the same tool 8. The process is repeated until the desired number of fiber plies are properly assembled and this can be from 2 to 30 or more depending on the construction sought. FIG. 7 shows a stabilized preform 21 on the tool 1 having four plies 6, 20, 22 and 23 which have been processed through the stabilization step. More plies could be added as required. FIG. 8 shows a final preform 23 removed from the tool and ready for molding.

The final step in producing the corrugated composite channel is to place the preform 23 into a mold, injecting resin into the mold and curing the resin. Of course, any resin can be used.

While the above has been described in relation to a plurality of single plies formed one by one during the production of the preform for the corrugated composite channel. This has been done to ease the illustration and it is possible that several plies can be formed at a single time depending on the thickness of the fiber plies, and the degree to which they are pliable. With a relatively thin flexible ply, it is possible that multiple plies up to a thickness no greater than about 0.07 inch can be assembled together and treated as a single thick ply. Over 0.07 inch, wrinkling may occur. That is, the collection of plies are stacked and then shaped, restrained, vacuum bagged and stabilized together, in essence modifying the above method by altering the first step so as to apply one or more plies together to the shaping tool.

Once formed, it is possible to add a second grouping of plies over the first group, following the same sequential steps described above.

While preferred embodiments of the present invention have been shown and described, it will be understood by those skilled in the art that various changes or modifications can be made without varying from the scope of the present invention.

We claim:

1. A method for making a corrugated fiber preform, comprising the steps of:

providing one or more fiber plies containing a stabilizer having sufficient adhesiveness to hold the fiber plies in their shape and having a thickness no greater than about 0.07 inch;

applying said fiber plies to a shaping tool having a corrugated surface with peaks and valleys, and having side surfaces;

pressing portions of the fiber plies into each of the valleys in a sequential manner, using a plurality of corrugating tools, until all the valleys are filled, and then pressing side portions of the plies against the side surfaces of the tool;

applying restraining means sequentially in each of the valleys, as each individual corrugating tool is lifed;

placing compression means over the plies and compressing the plies; and heating and then cooling the fiber plies to melt and then solidify the stabilizer to preserve the plies in their shaped and debulked form, and then applying one or more additional plies over the first formed plies, in accordance with the sequence of the previous steps and continuing until the desired preform thickness is reached.

2. The method of claim 1 wherein the step of applying restraining means comprises placing elastomeric straps with sufficient tension in each of the valleys.

3. The method of claim 1 wherein a plurality of corrugating tools are used to press the fiber plies on the tool, the restraining means being applied by the sequential lifting of the corrugating tools off the fiber plies, applying the restraining means under the lifted tool and then replacing the corrugating tool into the fiber valley over the restraining means until all the restraining means are in position and then removing the corrugating tools.

4. The method defined in claim 1 wherein the compression means comprise an air impermeable layer, which is placed over the fiber plies and sealed, and further comprising applying vacuum thereunder so as to use atmospheric pressure to compress the fiber plies.

5. The method of claim 1 wherein the step of pressing the fiber plies against the side surfaces comprises utilizing a hand held tool for bending the fiber plies against the side surfaces of the tool.

6. A method for producing a corrugated composite channel comprising:

(a) preparing a corrugated fiber preform, comprising the steps of: providing one or more fiber plies containing a stabilizer having sufficient adhesiveness to hold the fiber plies in their shape and having a thickness no greater than about 0.07 inch;

applying said fiber plies to a shaping tool having a corrugated surface with peaks and valleys, and having side surfaces;

pressing portions of the fiber plies into each of the valleys in a sequential manner, using a plurality of corrugating tools, until all the valleys are filled, and then pressing side portions of the plies against the side surfaces of the tool;

applying restraining means sequentially in each of the valleys, as each individual corrugating tool is lifed;

placing compression means over the plies and compressing the plies; and heating and then cooling the fiber plies to melt and then solidify the stabilizer to preserve the plies in their shaped and debulked form, and then applying one or more additional plies over the first formed plies, in accordance with the sequence of the previous steps and continuing until the desired preform thickness is reached; and (b) placing the preform into a mold, injecting resin into the mold and curing the resin.

* * * * *